US008966742B2

(12) United States Patent
Wolf et al.

(10) Patent No.: US 8,966,742 B2
(45) Date of Patent: Mar. 3, 2015

(54) METHOD OF PRODUCING A STATOR WINDING FOR AN ELECTRICAL MACHINE

(75) Inventors: Gert Wolf, Affalterbach (DE); Thomas Berger, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 801 days.

(21) Appl. No.: 12/094,184

(22) PCT Filed: Nov. 10, 2006

(86) PCT No.: PCT/EP2006/068339
§ 371 (c)(1),
(2), (4) Date: Sep. 3, 2008

(87) PCT Pub. No.: WO2007/057355
PCT Pub. Date: May 24, 2007

(65) Prior Publication Data
US 2009/0160286 A1   Jun. 25, 2009

(30) Foreign Application Priority Data
Nov. 21, 2005  (DE) .......................... 10 2005 054 863

(51) Int. Cl.
*H02K 15/00* (2006.01)
*H02K 15/04* (2006.01)
*H02K 3/12* (2006.01)
*H02K 3/24* (2006.01)

(52) U.S. Cl.
CPC .............. *H02K 15/0414* (2013.01); *H02K 3/12* (2013.01); *H02K 3/24* (2013.01)
USPC .................. 29/596; 29/598; 29/606; 310/207

(58) Field of Classification Search
USPC ........................... 29/596–598, 732, 605–609; 310/201–208
See application file for complete search history.

(56) References Cited

U.S. PATENT DOCUMENTS

| 3,621,311 | A  | * | 11/1971 | Axel Von Starck et al. .... 310/13 |
| 5,628,253 | A  | * | 5/1997 | Ozeki et al. .................... 104/292 |
| 6,498,413 | B2 | * | 12/2002 | Imori et al. .................... 310/180 |
| 6,657,352 | B1 | * | 12/2003 | Asao et al. ..................... 310/180 |
| 6,703,750 | B2 |   | 3/2004 | Nakamura |
| 6,791,224 | B1 | * | 9/2004 | Ozawa et al. ................. 310/179 |
| 6,882,077 | B2 | * | 4/2005 | Neet ............................. 310/208 |
| 6,901,649 | B2 | * | 6/2005 | Imori et al. ..................... 29/596 |
| 6,960,857 | B2 | * | 11/2005 | Oohashi et al. ............... 310/179 |
| 7,703,192 | B2 | * | 4/2010 | Sadiku et al. ................... 29/596 |
| 2001/0019234 | A1 | * | 9/2001 | Murakami et al. ............ 310/180 |

(Continued)

FOREIGN PATENT DOCUMENTS

| DE | 101 19 776 | 11/2001 |
| EP | 1 122 861 | 8/2001 |
| EP | 1 134 872 | 9/2001 |

(Continued)

*Primary Examiner* — Minh Trinh
(74) *Attorney, Agent, or Firm* — Michael J. Striker

(57) ABSTRACT

A method of producing a stator winding for a stator of an electrical machine includes positioning a phase winding segment of the stator winding in a same plane in a serpentine manner in a first direction (X) and in a shape of a wave in a second direction (Y) transverse to the first direction. The method includes bending regions (A, B, C) of the phase winding segment toward one another along a folding line to form a lap winding including positioning regions (C) parallel to each other connected by regions (B) where the regions (B) cross the at least one folding line (108). The phase winding is formed with a continuous wire.

20 Claims, 7 Drawing Sheets

(56) References Cited

U.S. PATENT DOCUMENTS

| | | |
|---|---|---|
| 2001/0020807 A1 | 9/2001 | Imori et al. |
| 2003/0015932 A1 | 1/2003 | Oohashi et al. |
| 2004/0119362 A1 | 6/2004 | Neet |

FOREIGN PATENT DOCUMENTS

| | | |
|---|---|---|
| EP | 1 179 880 | 2/2002 |
| JP | 2001-339891 | 12/2001 |
| JP | 2003-32933 | 1/2003 |

* cited by examiner a) b) c) d)

a) b)

METHOD OF PRODUCING A STATOR WINDING FOR AN ELECTRICAL MACHINE

CROSS-REFERENCE TO A RELATED APPLICATION

The invention described and claimed hereinbelow is also described in German Patent Application DE 10 2005 054 863.6 filed on Nov. 21, 2005. This German Patent Application, whose subject matter is incorporated here by reference, provides the basis for a claim of priority of invention under 35 U.S.C. 119 (a)-(d).

BACKGROUND OF THE INVENTION

Methods for manufacturing a stator winding for a stator of an electrical machine are known from the related art. In these methods, "unordered" windings are often manufactured, for reasons of cost. With this type of winding, it is possible to only approximate the subsequent position of the conductor in advance, since the stator winding is often wound onto winding stars, and the winding stars that are produced are then drawn into the stator. Since the configuration and shape, in particular, of the conductor in the winding overhang are not easily influenced, this type of winding is also referred to as a "wild" winding. It has been shown, however, that unordered windings create loud flow noise during operation, and cooling the conductor in the winding overhang evenly is not entirely possible. These disadvantages may be avoided using ordered windings, since, in this case, the conductors have defined positions. These ordered windings are manufactured as plug-in windings. This is a very laborious process, since the individual U-shaped sections of the winding—once they have been inserted in the stator core—must be bent into position and then welded, to establish the electrical contacts. One possibility for simplifying the manufacture of an ordered winding is described in patent application US 2004/0119362 A1 for the simple case of a single-layer wave winding.

SUMMARY OF THE INVENTION

With a method for producing a stator winding for a stator of an electrical machine, in particular for a motor vehicle, it is provided according to the present invention that the at least one segment of the stator winding is positioned in a plane, and that regions of the segment are bent toward one another along at least one folding line, thereby resulting in a lap winding. The unique characteristic of the method is that the segment is initially positioned in a plane. It should be understood, in particular, that the segment is located, placed, and/or formed in the plane, or it is produced in another manner. This is how the course of the segment within this plane is formed. Via the positioning, the segment in the top layer forms a certain path within the plane. At least one folding line, and usually several folding lines, which are located parallel to each other in particular, are defined within the plane. Regions of the segment are bent toward each other along at this at least one folding line. The topology of the segment in the plane was selected such that a lap winding is produced after the segment has been bent. The starting point, therefore, is a flat winding, in the case of which the segment—when in the flat state—may be offset and/or stamped particularly easily in any desired position. In the finished state, the segment then forms an at least two-layered structure, which is the stator winding for the electrical machine. Since a segment (for a phase) may be produced individually, the significance of this for an electrical machine with several phases is that they may be produced separately. A further advantage is that this is a multi-layered basic structure, i.e., much fewer offsets are required to obtain the finished state than is the case with a single-layer solution. A preferred variant for performing this method includes the following working steps:
1. Produce/position the flat segment
2. If necessary, stamp/offset the segment at the required points
3. Fold the segment along the at least one folding line.

The further processing of a stator winding produced in this manner is also particularly simple. Only the following steps are required:
1. Insert the winding in the stator core
2. Bend the stator core, if necessary
3. Shape the winding overhang, if necessary An ordered lap winding may be produced very cost-effectively in this manner.

Advantageously, in the folded state, at least a first segment comes to rest in parallel with a second segment. Segments that are oriented relative to each other in this manner may be placed in the slots of the stator core later in a particularly easy manner. A "segment" is a section along the extension of a phase winding. The definition of a segment of this type may be purely virtual, i.e., it is not tied to any certain physical characteristics or to any particular interruption of the segment. However, the beginning or end of a phase winding section is often associated with the fact that the segment often changes direction within the plane, e.g., it bends sharply.

It is preferred that the positioning of a segment of the phase winding in a first direction of the plane corresponds to a slot number of a subsequent slot position of the phase winding section, and that the positioning of a phase winding segment in a second direction of the plane that is perpendicular to the first direction corresponds to a radial position of the phase winding segment within a slot. A convention of this type simplifies the understanding and realization of the topology of the segment that is required to obtain a certain lap winding. It is then particularly easy to define topologies of the segment, to interpret existing topologies, and to implement desired changes. The work performed based on this principle is explained in greater detail below with reference to the following exemplary embodiments.

Advantageously, the segment is positioned in the first direction in a serpentine manner, and/or it is positioned in the second direction in a wave-shaped manner. The serpentine structure ensures that the available plane is utilized in an optimal manner. The wave-shaped positioning in the second direction is a favorable possibility for obtaining the lap winding when the segment is folded.

Advantageously, regions in the plane are defined that make it possible to assign segments to at least one winding overhang or to a stator core. This means that, by selecting the topology of the segment, it is possible to specify which segments will lie in the slots of the stator core after the stator winding is produced, and which segments will form the at least one winding overhang.

According to a refinement of the present invention, one phase winding segment extends at a slant to the first and second directions in the regions that are assignable to a winding overhang. The technical effect of this procedure is apparent when the following stator winding is considered. For example, such a course of the segment results in the segment being guided further in another slot, and in the radial position of the segment changing within the slot relative to its previous position. A phase winding segment of this type will typically cross the fold line, since the change in the radial position may then be brought about in a particularly simple manner.

It is furthermore preferred that the course of a phase winding segment extend parallel to the second direction in the regions that are assignable to a stator core.

Advantageously, several segments that extend largely in parallel with each other are used to produce the stator winding. The production of a multi-phase stator winding of this type is realized very easily via repeated application of the method described above. To this end, several segments may be easily manufactured and placed in a magazine before the winding is folded. As soon as the required number of segments in the magazine has been attained, the segment is folded to form the stator winding.

The positioning of the segments is preferably designed as a distributed winding. In this manner, the crossings of individual segments are spacially offset, thereby simplifying the handling of the crossings.

According to a refinement of the present invention, one end of a phase winding segment that is assignable to a winding overhang leads into a different radial position within a slot than does the other end of this phase winding segment. As a result, the structure of the finished stator winding—which has at least two layers—may be deduced from the topology of the segments in the plane.

Advantageously, the number of segments that cross the fold line is equal to the number of slots of the assigned stator core. At least one segment is therefore assigned to each slot in the stator core.

It is also advantageous that, for the folded stator winding, the position of the phase winding segments within the slots changes in a radially progressive manner, and the direction of the radial progression is reversed at least one reversal point. This results in a realization of the multi-layered design with a particularly good structure.

It is particularly preferred to use a continuous wire for the segment. Even though it is basically possible to also form the segment out of several elements, which are then interconnected electrically, the unique characteristic of the present invention is that a continuous wire may be used. This simplifies manufacture and reduces production costs.

According to a refinement of the present invention, a rectangular wire is used for the segment. Particularly high stator fullness factors may be attained as a result. The winding produced with round wire may also be stamped in the slot region after production. This results in a high copper factor.

Advantageously, the diameter of the conductor, which forms the phase winding, essentially corresponds to the slot width of the slots in the stator core, or it is greater than the slot width. This prevents or reduces slippage of the conductor in the slots. The stator winding may also be used as an insertion winding for an "open slot" stator core (open slot=stator teeth without crests, and the winding in a round stator core is assembled from the inside).

The stator winding is preferably inserted into a flat core. The manufacture of the electrical machine is simplified as a result.

According to a preferred refinement of the present invention, the lengths of the phase winding segments located outside of the stator core vary, in particular in order to create a constant winding overhang height.

According to a further variant, one layer of the phase winding segments stacked in a slot extends markedly above the other layers, in order to perform a cooling function; this layer is slanted, in particular, toward the inner diameter of the stator. This allows air to flow around the outermost layer particularly well and cool it.

The present invention also relates to a stator winding for a stator of an electrical machine, in particular for a motor vehicle, in the case of which the stator winding is designed as a lap winding with at least two layers, using one of the methods described above. The stator winding advantageously has features that it may be attained by using one of the methods described above.

Finally, the present invention also relates to an electrical machine, in particular for a motor vehicle, in the case of which a stator winding of the machine is designed as a lap winding with at least two layers, using one of the methods described above.

BRIEF DESCRIPTION OF THE DRAWINGS

The present invention will now be explained in greater detail with reference to the drawing.

DETAILED DESCRIPTION OF THE INVENTION

Figure 1:
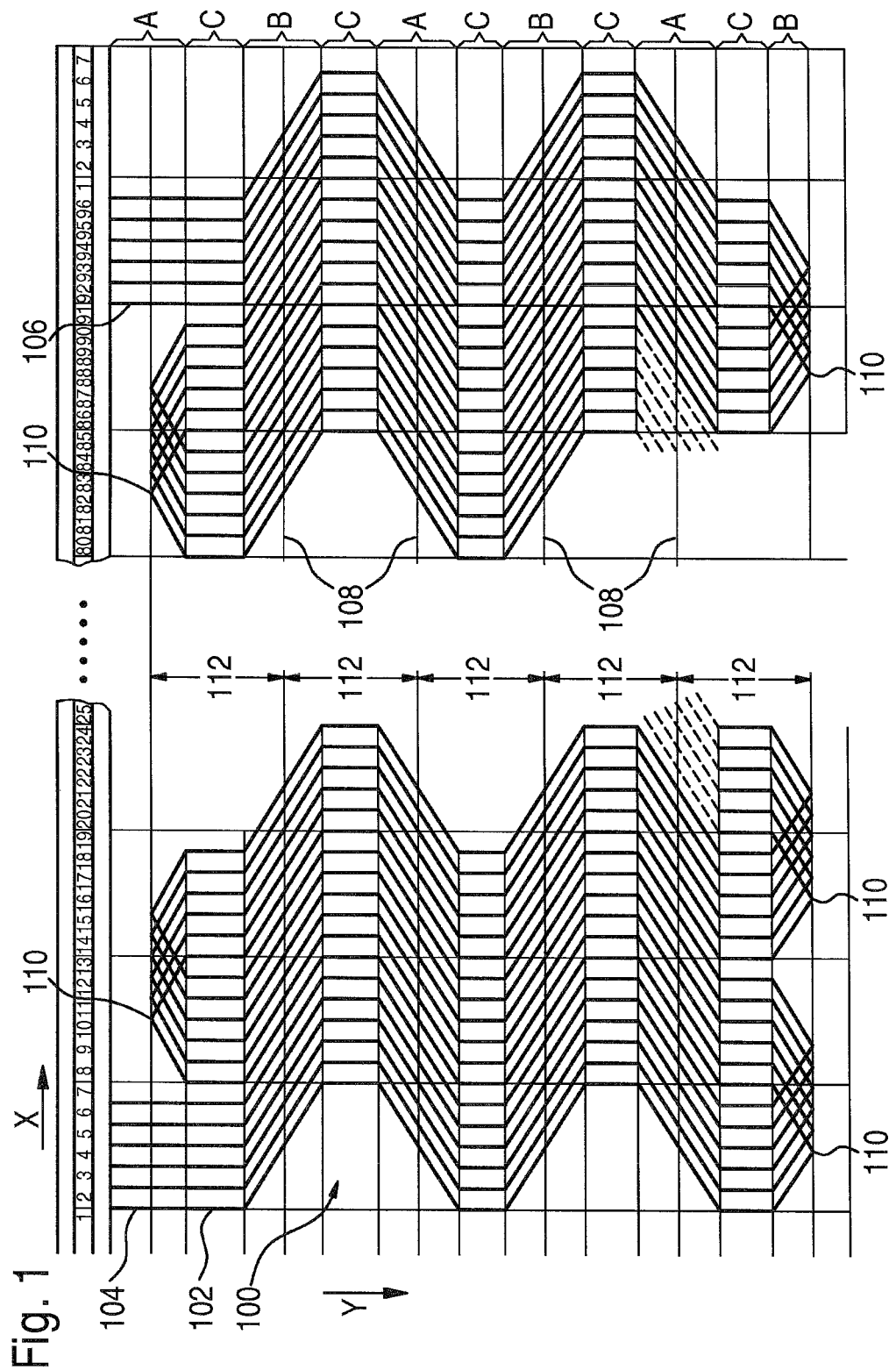
FIG. 1 shows a flat winding with six phases, five conductors per slot, and 96 slots.

A first exemplary embodiment of a flat winding is shown in FIG. 1. This is a stator winding 100 with six phases, five conductors per slot, and 96 slots. Stator winding 100 is shown in the unfolded state in this case. To limit the illustration to the essential features, only a portion of the region between slots 19 through 84 is shown. The winding continues in the not-shown region the same as it does in the region shown. Stator winding 100 is composed of six segments. Only first segment 102, which begins with a segment start 104 in slot 1, will be discussed here. These descriptions also apply for the further segments, which start in slots 2 through 6. Segment 102 ends at segment end 106 in slot 91. Fourfold lines 108 are shown, which extend across all slots. Entire stator winding 100 extends in an XY plane that has a first direction X and a second direction Y. The slots with their ordinal numbers are plotted in increasing order in the X direction. In the Y direction, the segments—including first segment 102—are subdivided into several regions. A is a region of stator winding 100 that, in the folded state, will lie on the A side of the stator core (connection side), where it forms a first winding overhang. B refers to the second winding overhang, which is located on the "B" side, opposite to the first winding overhang. The regions on the B side are "upside down". The regions of the segment that will eventually come to rest in the slots of the stator core are labeled "C").

The course of first segment 102 will now be explained, along with the subsequent position of stator winding 100 in the stator core. Beginning with segment start 104, segment 102 lies initially on the A side, and is guided through the stator core (region C) to the B side. It is assumed that the segment will come to rest in the innermost interior of the slot, i.e., next to the center of the stator. After segment 102 exits the stator core on the B side, it crosses a fold line 108 and is guided to slot 7. After the obvious change of slots, which occurs when fold line 108 is crossed, segment 102 is now guided further in a different radial position within slot 7 than is the case in slot 1. When counting starting from the innermost interior of the slot, segment 102 therefore switches from a first layer to a second layer. After this switch, segment 102 in slot 7 is guided through stator core (region C). On the A side, segment 102 is returned from slot 7 to slot 1, and its radial position within the slot changes. The segment is now guided further in a third layer. Segment 102 is guided back through the stator core, switches slots and the radial position again on the B side, crosses the stator core again, switches from slot 7 to slot 1, and crosses the stator core again, now in the fifth layer. Back on the B side, segment 102 is guided to a reversal point 110. Reversal point 110 is described based on the Y direction. From reversal point 110, segment 102 is now guided back, using slots 7 and 13 in an alternating manner. When viewed radially, segment 102 travels back from the fifth layer to the first layer. The radial direction of motion reverses once more, at reversal point 110, and continues until segment 102 ends at segment end 106 in slot 91.

Since the segments would come in contact with each other when the subsequent segments are positioned closed to reversal point 110, segment 102 is now offset in the vicinity of its reversal point 110. This means that, in this case, the segment portion leading away from reversal point 110 is located a bit lower in the XY plane than is the segment portion leading into reversal point 110. As a result, the subsequent segments may be guided over the segment section leading away from reversal point 110. After segment 102 is positioned in the XY plane accordingly, the five subsequent segments are positioned according to the same principle. The topology shown in FIG. 1 ultimately results.

In the next step, the segments are folded along fold lines 108. In this case, segment regions 112 are folded toward each other, in the manner of an accordion (see FIG. 7, a)). Basically, other types of folding techniques may also be used (see, e.g., FIG. 7, c)). The creation of the windings in stator winding 100 is particularly easy to trace by drawing the topology of the segments on a piece of transparent foil and then folding it along fold lines 108. The windings that are guided, e.g., through slots 1 and 7, are then clearly visible when viewed from above. It also becomes obvious that segment portions in regions C come to rest in parallel with each other. Segment sections that are located on top of each other are placed in the same slot in the stator core.

As shown in the topology, it is clear that the segments are positioned in a serpentine manner in the first direction, and they are positioned in a wave-shaped manner in the second direction. The segments are guided in parallel up to the region of reversal points 110, where crossovers must occur.

Figure 2:
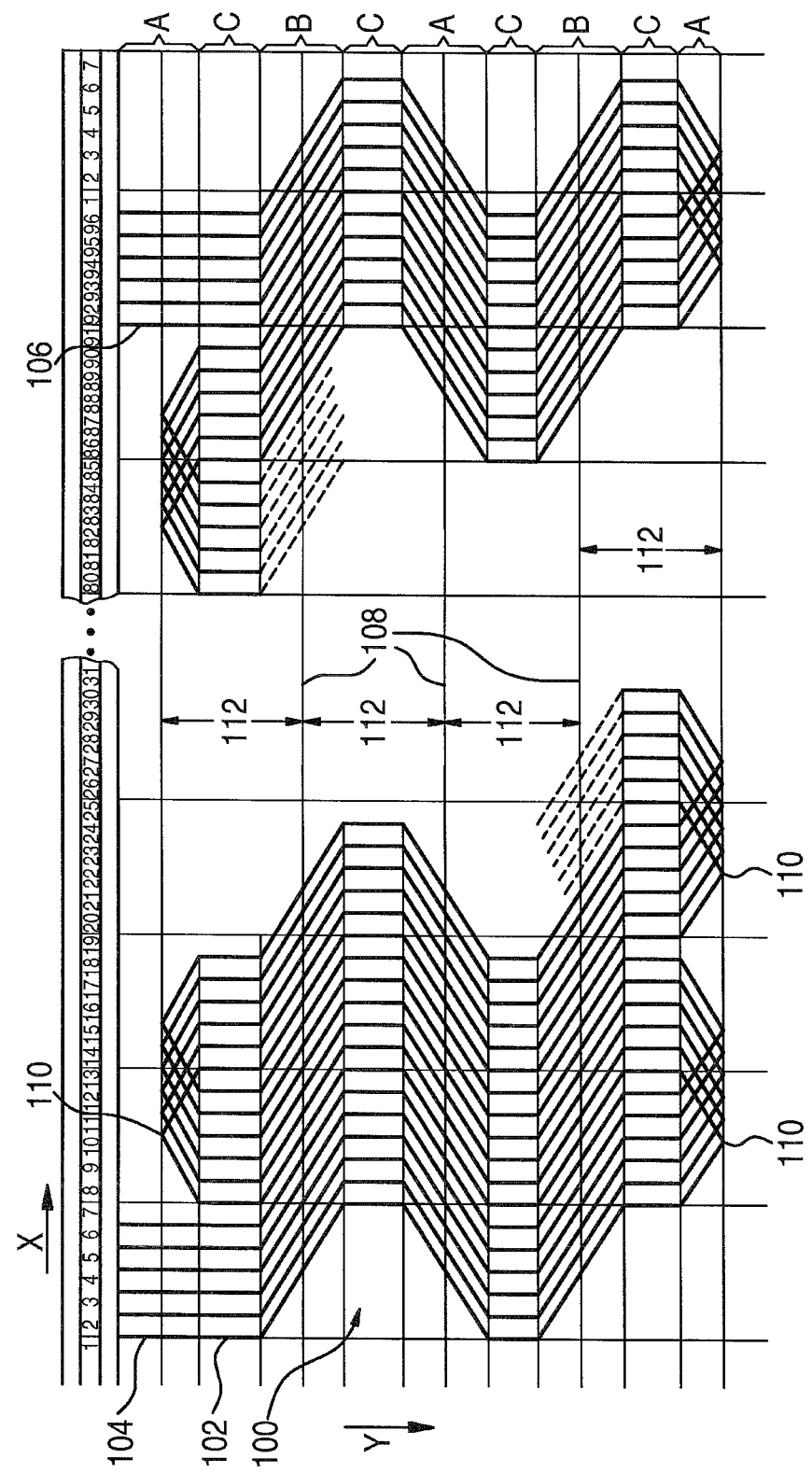
FIG. 2 shows a flat winding with six phases, four conductors per slot, and 96 slots.

FIG. 2 shows a further exemplary embodiment of a flat winding, in this case with six phases, four conductors per slot, and 96 slots. To explain FIG. 2, reference is made to the descriptions of FIG. 1, which essentially apply here as well. Compared with FIG. 1, which shows the embodiment of the present invention for an uneven number of conductors per slot, FIG. 2 shows the design for an even number of conductors per slot.

Figure 3:
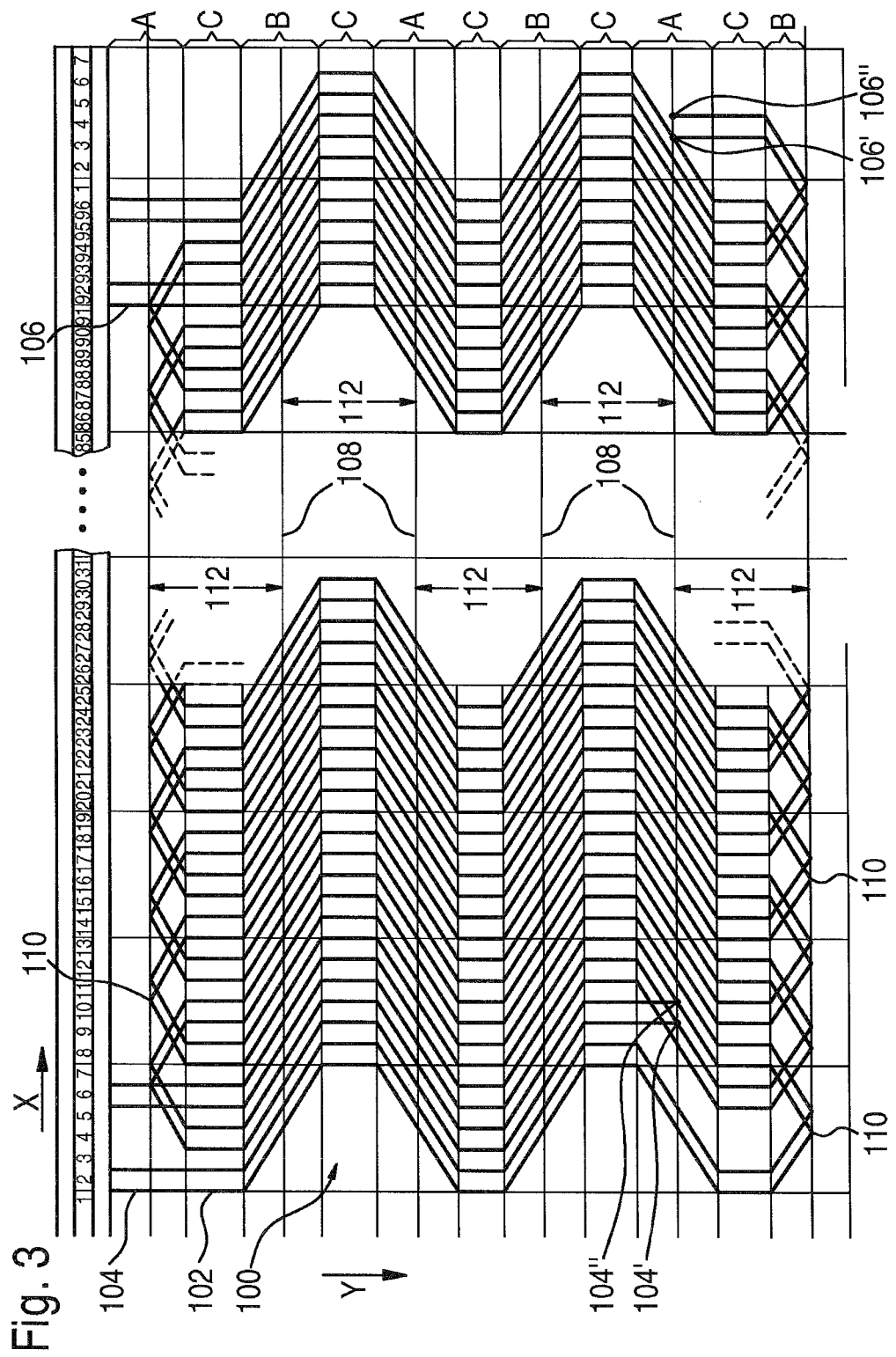
FIG. 3 shows a flat winding with six phases, five conductors per slot, and 96 slots, designed as a distributed winding.

FIG. 3 shows a further exemplary embodiment of a flat winding, in this case with six phases, five conductors per slot, and 96 slots, in the embodiment as a distributed winding. The term "distributed winding" means that reversal points 110 are now spacially offset. This is made particularly clear in comparison with FIG. 1. In FIG. 1, six reversal points 110 are located very close to each other, and the individual groups of six reversal points 110 are each separated by a distinct distance. In comparison, two reversal points 110 in FIG. 3 form one group, and each group is separadated from the other. Spacial offsetting allows the manufacturing process to be simplified. In addition, the regular shape results in the advantage of low flow noise. To explain FIG. 3, reference is made to the descriptions of FIG. 1, which also apply here. Reference is made only to the special positioning of segment starts 104', 104" and segment ends 106', 106" of the third and four the segment.

Figure 4:
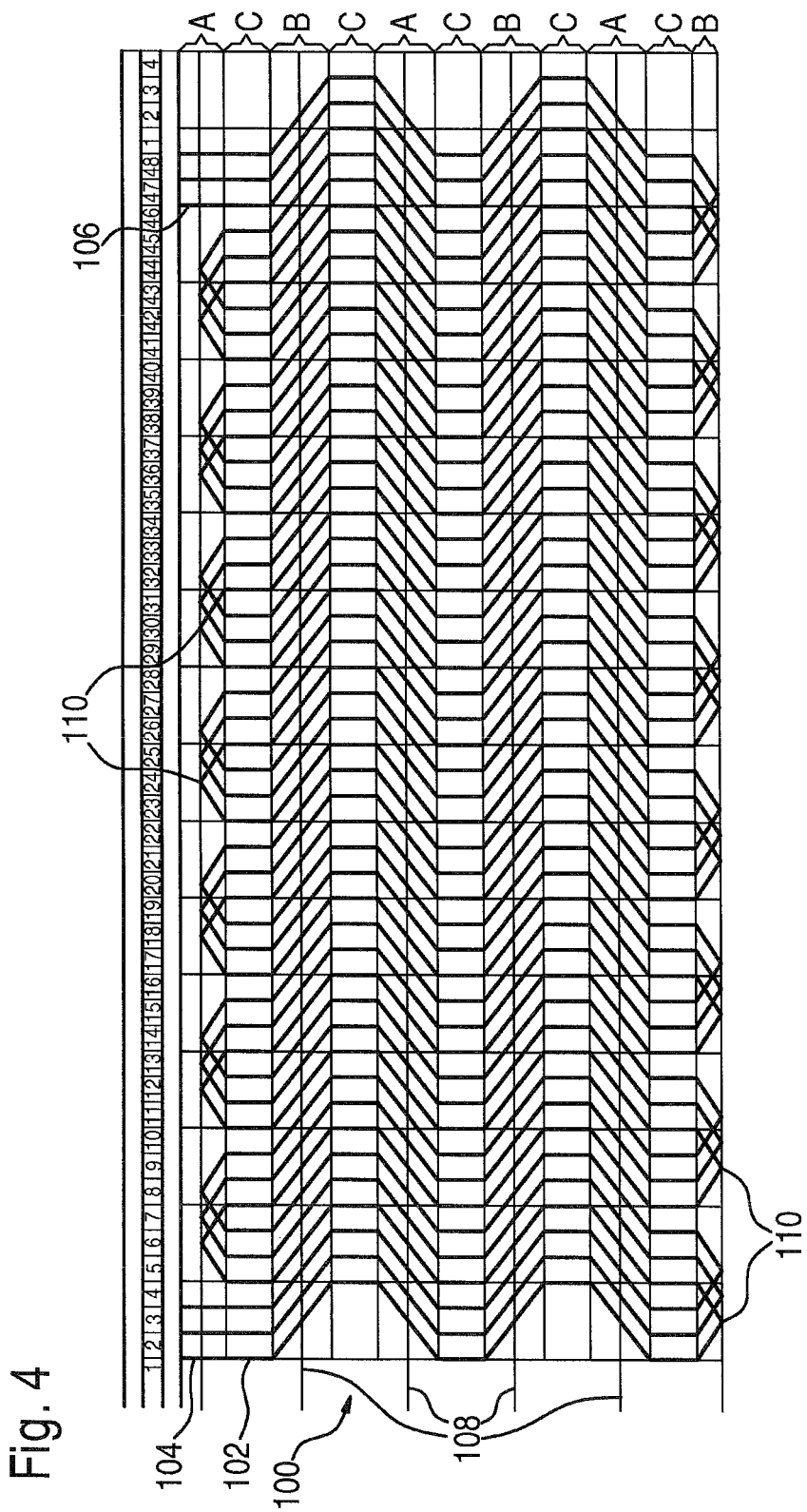
FIG. 4 shows a flat winding with three phases, five conductors per slot, and 48 slots.

A further exemplary embodiment Is shown In FIG. 4. This is a flat winding with three phases, five conductors per slot, and 96 slots. To explain FIG. 4, reference is made to the descriptions of FIG. 1, which also apply here. This exemplary embodiment also demonstrates that the present invention may be used in a very flexible manner.

Figure 5:
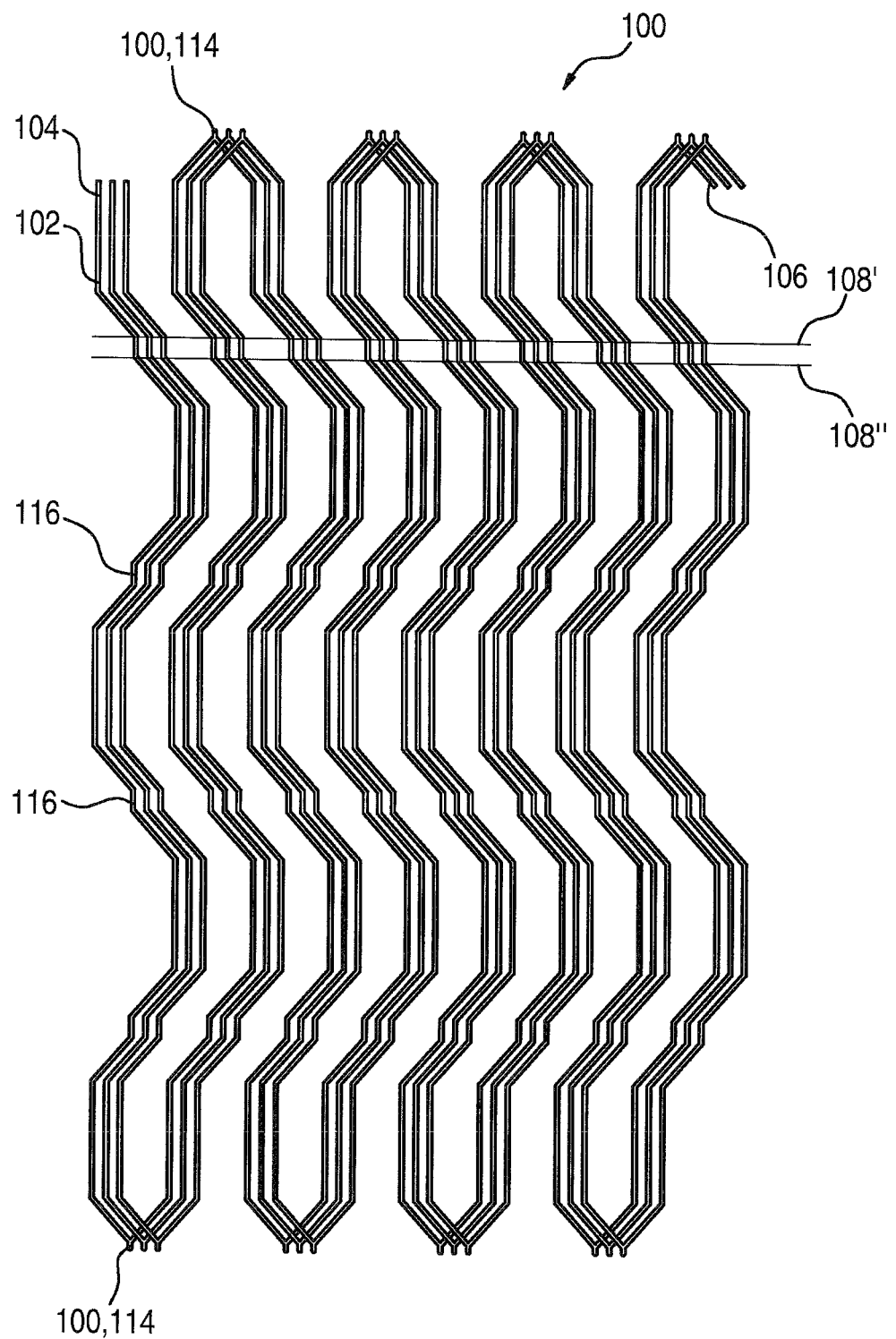
FIG. 5 shows an intermediate step in the production of a 6-phase stator winding.

FIG. 5 now transitions from the general explanations of the present invention to a specific design of the segments. Three segments of a stator winding 100 are shown, which, in the finished state, will have a 6-phase design. The topology shown in FIG. 1 is based on the segments. Only first segment 102 will be discussed in the further explanation. In the specific embodiment, it is clear that the first segment includes one offset 114 or several offsets 114 at its reversal points 110. It is therefore possible to position the individual segments in parallel, without their touching each other. In addition, intermediate pieces 116 serve to ensure that the segment may be guided in the winding overhang in a well-defined manner and without contact. Two fold lines 108' and 108" are used for this purpose between the layers.

Figure 6:
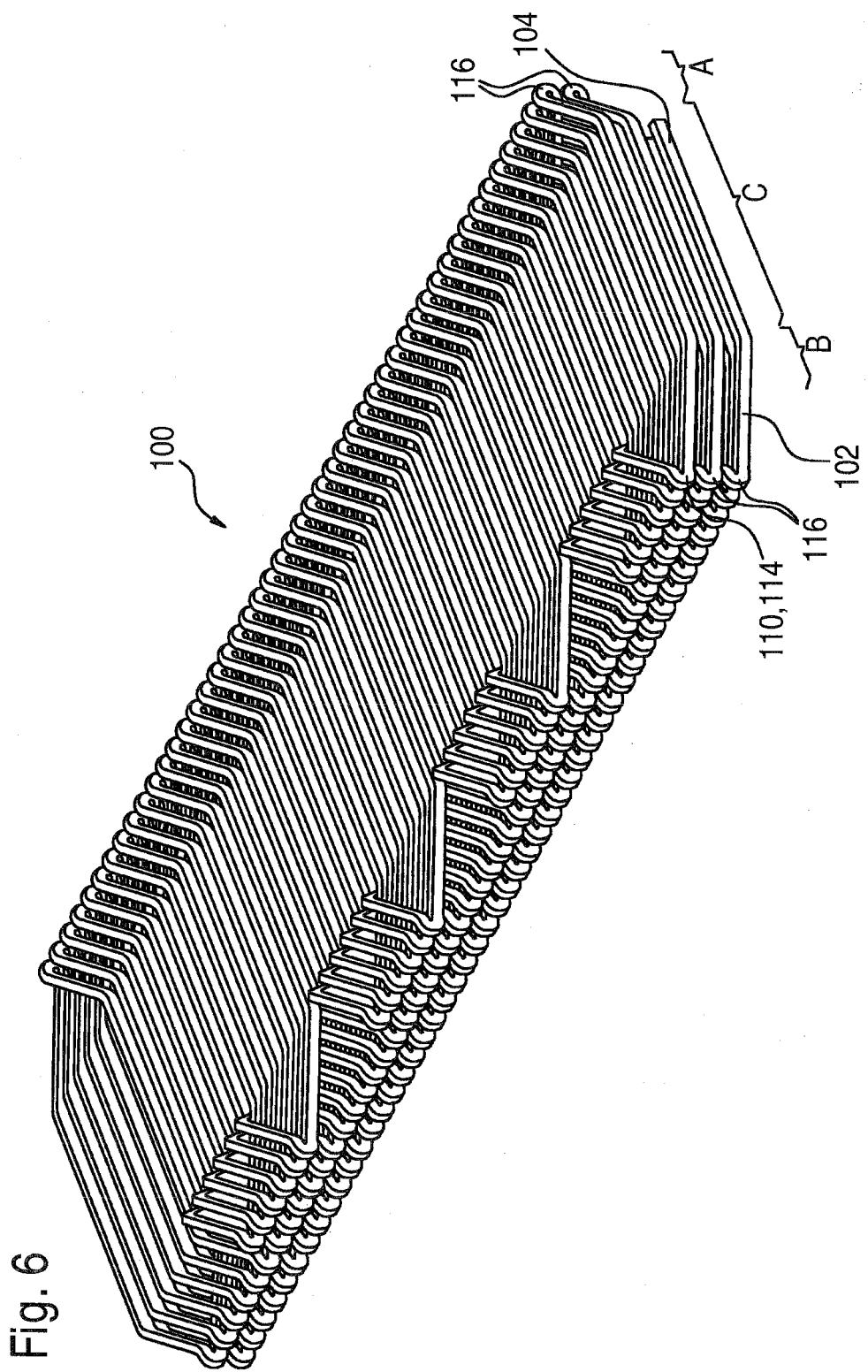
FIG. 6 shows an exemplary embodiment of a fully folded stator winding.

FIG. 6 shows a fully-folded, six-phase stator winding 100 with all six segments. The transition into the individual layers and the handling of the crossovers at reversal points 110 are clearly shown. Stator winding 10 may be used directly as a flat winding for insertion into a flat stator core, which will be eventually bent into a round shape, or as an "open slot" winding, which is inserted using an inner mandrel from the interior into a round core.

Figure 7:
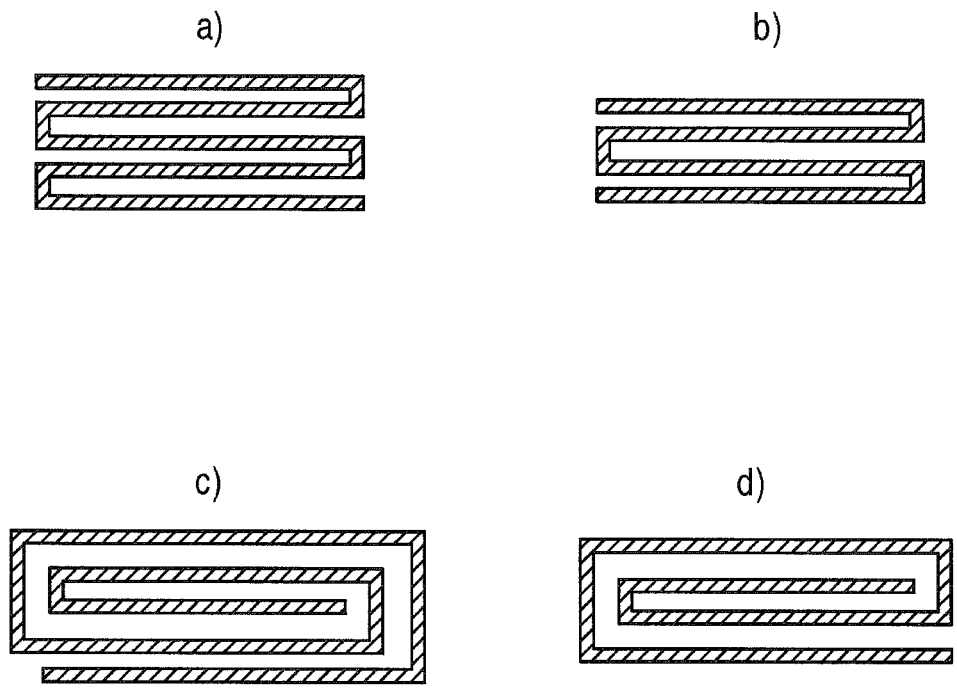
FIG. 7 shows different variants of the folding procedure.

FIG. 7 shows various possibilities for folding the segments placed in a plane. FIG. 7 a) is a five-layer configuration for five conductors per slot. The folding was carried out in the manner of an accordion. With b), the same folding technique is shown for a four-layer configuration. Part c) shows that the individual layers may also be folded around each other, thereby resulting in a spiral. Finally, with d), the same folding technique is shown for a four-layer configuration.

Figure 8:
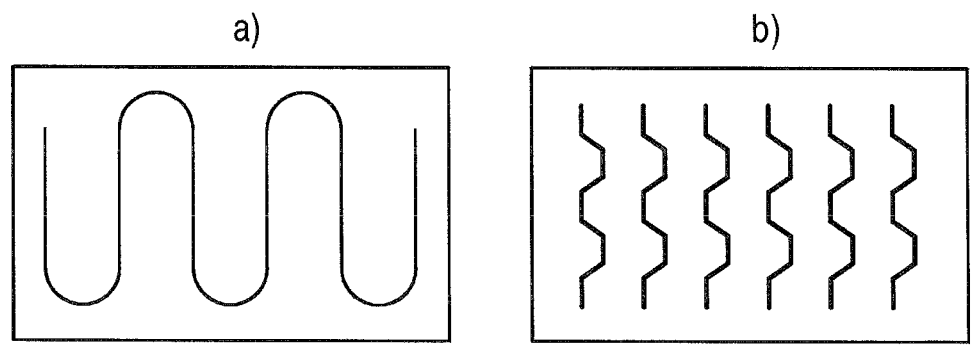
FIG. 8 is a symbolic depiction of the difference between a wavy structure and a serpentine structure.

In FIG. 8, the meaning of "serpentine" and "wave-shaped" is depicted symbolically. In region a), the serpentine positioning of one or more segments in the first direction, X, is shown. In comparison, the wave-shaped positioning in the second direction, Y, is shown in region b). The result is that these structures overlap in a known manner, thereby resulting in the exemplary embodiments described above.

What is claimed is:

1. A method of producing a stator winding (100) for a stator of an electrical machine, comprising the steps of starting a winding start (104) of at least one phase winding segment (102) in a position that corresponds to a slot number of a subsequent slot position and of further phase windings in further positions that correspond to slot numbers of subsequent slot positions;

positioning the at least one phase winding segment (102) of the stator winding (100) in a same plane in a serpentine manner in a first direction (X) and in a shape of a wave in a second direction (Y), which second direction is transverse to the first direction;

bending regions (A, B, C) of the phase winding segment (102) toward one another along at least one folding line (108) into a folded state, and positioning regions (C) of the phase winding segment (102) parallel to each other connected by regions (B) whereby the regions (B) cross the at least one folding line (108), thereby resulting in a lap winding;

wherein continuous wire from a winding start (104) of the at least one phase wind segment 102 to a winding segment end (106) is used for the at least one phase winding segment (102).

2. The method of producing a stator winding as defined in claim 1, further comprising lying at least one first segment of the phase winding segment (102) in parallel with a second segment of the phase winding segment (102).

3. The method of producing a stator winding as defined in claim 1, further comprising positioning a segment of the phase winding segment (102) in the first direction (X) of the plane such that it corresponds to a slot number of a subsequent slot position of the segment of the phase winding segment (102), and positioning the segment of the phase winding segment (102) in the second direction (Y) of the plane that is perpendicular to the first direction (X), such that it corresponds to a radial position of the segment of the plane winding within a slot.

4. The method of producing a stator winding as defined in claim 3, further comprising providing in the regions (C) that are assignable to a stator core, a course of a segment of the phase winding parallel to the second direction (Y).

5. The method of producing a stator winding as defined in claim 1, further comprising defining segments of the phase winding within the plane, which make it possible to assign segments to at least one winding overhang or a stator core.

6. The method of producing a stator winding as defined in claim 1, wherein in the regions (A, B, C) that are assignable to a winding overhand, slanting a course of a segment of the phase winding relative to the first and second direction (X,Y).

7. The method of producing a stator winding as defined in claim 1, further comprising placing several phase windings of the at least one phase winding segment (102) substantially in parallel to manufacture the stator winding (100).

8. The method of producing a stator winding as defined in claim 1, further comprising providing positioning of the phase windings which results in a distributed winding.

9. The method of producing a stator winding as defined in claim 1, further comprising leading one end of a segment of the phase winding that is assignable to a winding overhang, into a different radial position within a slot than does another end of the segment.

10. The method of producing a stator winding as defined in claim 1, further comprising providing a number of segments of the phase winding that cross the folding line (108) to be equal to a number of slots in an assigned stator core.

11. The method of producing a stator winding as defined in claim 1, further comprising for the stator winding (100) which is folded, changing a position of segments of the phase winding within slots in a radially progressive manner, and reversing a direction of a radial progression at at least one reversal point (110).

12. The method of producing a stator winding as defined in claim 1, further comprising providing a rectangular wire for a segment of the phase winding.

13. The method of producing a stator winding as defined in claim 1, further comprising providing a diameter of a conductor that forms the phase winding segment (102) substantially corresponding to a slot width of slots in the stator core.

14. The method of producing a stator winding as defined in claim 1, further comprising changing a shape of a conductor in a flat or folded state via stamping.

15. The method of producing a stator winding as defined in claim 1, further comprising stamping sections of a conductor lying in slots.

16. The method of producing a stator winding as defined in claim 1, further comprising placing the stator winding (100) in a flat core.

17. The method of producing a stator winding as defined in claim 1, further comprising varying lengths of segments of the phase winding located outside of a stator core, in order to create a constant winding overhang height.

18. The method of producing a stator winding as defined in claim 1, further comprising extending one layer of segments of the phase winding stacked in a slot markedly above other layers, in order to perform a cooling function, and slanting this one layer toward an inner diameter of the stator.

19. The method of producing a stator winding as defined in claim 1, further comprising providing one or more offsets in a region of a winding overhang at reversal points or next to the reversal points.

20. A method of producing a stator winding (100) for a stator of an electrical machine, comprising the steps of positioning at least one phase winding segment (102) of the stator winding (100) in a same plane in a serpentine manner in a first direction (X) and in a shape of a wave in a second direction (Y), which second direction is transverse to the first direction;

bending regions (A, B, C) of the phase winding segment (102) toward one another along at least one folding line (108) into a folded state, thereby resulting in a lap winding, including positioning regions (C) of the phase winding segment (102) parallel to each other connected by regions (B) whereby the regions (B) cross the at least one folding line (108); and using a continuous wire from a winding start (104) of the at least one phase winding segment (102) to a winding segment end (106) for the at least one phase winding segment (102).

* * * * *